United States Patent [19]
Szczepanski et al.

[11] Patent Number: 6,038,938
[45] Date of Patent: Mar. 21, 2000

[54] SHIFT FORK/GATE ASSEMBLY

[75] Inventors: Gerald Szczepanski, Detroit; John Forsyth, Romeo, both of Mich.

[73] Assignee: New Venture Gear, Inc., Troy, Mich.

[21] Appl. No.: 08/943,308

[22] Filed: Oct. 14, 1997

[51] Int. Cl.$^7$ ................ G05G 5/08; B23P 15/00
[52] U.S. Cl. ............ 74/473.24; 29/527.6; 29/897.2; 74/473.37
[58] Field of Search ............ 74/473.21, 473.24, 74/473.25, 473.36, 473.37; 29/527.5, 527.6, 897, 897.2

[56] References Cited

U.S. PATENT DOCUMENTS

| | | | |
|---|---|---|---|
| 3,857,299 | 12/1974 | Morrison | 74/473.21 X |
| 4,784,009 | 11/1988 | Sakamoto et al. | 74/473.21 |
| 4,799,399 | 1/1989 | Bruce | 74/473.21 |
| 4,883,296 | 11/1989 | Laurie | 292/336.3 |
| 5,295,412 | 3/1994 | Donato et al. | 74/473.21 X |
| 5,417,419 | 5/1995 | Anderson et al. | 29/527.6 X |

OTHER PUBLICATIONS

Brown, Colin D. *Dictionary of Metallurgy*, Chichester: John Wiley & Sons Ltd. 1998, p. 212.

*Primary Examiner*—Sherry L. Estremsky
*Attorney, Agent, or Firm*—Harness, Dickey & Pierce, P.L.C.

[57] ABSTRACT

A shift fork/gate assembly is provided for use in a manual transmission of the type including a gear train having a plurality of gears disposed thereon and a shift control assembly for selecting one of the plurality of gears. The shift fork/gate assembly includes a shift fork member engaging a synchronizer device along the gear train. A gate member is connected to the fork member by inserting a portion of the gate member into an aperture formed in the fork member. The gate member selectively cooperates with a blocker of the shift control assembly to selectively prevent movement of the shift fork member until the shift control assembly is properly aligned.

19 Claims, 6 Drawing Sheets

SHIFT FORK/GATE ASSEMBLY

BACKGROUND OF THE INVENTION

1. Technical Field

The present invention generally relates to linear transmissions and, more particularly, to a modular, two-piece, shift fork and gate assembly for interconnecting the shift controller assembly and the drive train in a manual transmission.

2. Discussion

As is known, manual transmissions include a plurality of gearing assemblies for selectively interconnecting an input shaft and an output shaft for effectuating different ratios of rotation for propelling the motor vehicle in which the manual transmission is installed. To select different gearing assemblies, a selector assembly is provided for interconnecting different gearing combinations between the input shaft and the output shaft. In order to prevent the selector assembly from selecting two or more gearing assemblies simultaneously, a plurality of gates may be provided which cooperate with blockers fixed to the transmission housing to prevent selector rail movement prior to proper alignment.

According to the prior art, selector assembly gates are formed by casting, stamping or powdered metal technologies. Due to the tolerances achievable by these processes, the gate must then be machined to prepare a surface suitable for subsequent processing. After machining, the end of the gate is positioned within a die in the form of a fork or specialized link member. Molten metal is then poured into the die so as to encompass the end of the gate. As the metal hardens, the fork or specialized link member is cast in place around the gate. As can be appreciated, the machining process required to prepare the gate for the fork casting step is costly, tedious and time-consuming. Additionally, due to the brittle nature of cast or powdered metal components, bending or post-cast modifying of the assembly results in fractures. Therefore, very strict tolerances must be adhered to when processing the gate. Furthermore, if either the gate or fork is incorrect, the entire assembly must be replaced.

Therefore, it would be desirable to provide a shift fork/gate assembly which can be formed with fewer steps, less expense, and which permits modular replacement of assembly piece parts.

SUMMARY OF THE INVENTION

The above and other objects are provided by a shift fork/gate assembly for use in a manual transmission of the type including a gear train having a plurality of gears disposed thereon and a shift control assembly for selecting one of the plurality of gears. According to the invention, the shift fork/gate assembly includes a cast shift fork member engaging a synchronizer device along the gear train. A forged gate member is connected to the fork member by inserting a portion of the gate member into an aperture formed in the fork member. The gate member selectively cooperates with the blocker of the shift control assembly to selectively prevent movement of the shift fork member until the shift control assembly is properly aligned.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

The present invention is directed towards a novel shift fork/gate assembly for use in a manual transmission of a motor vehicle. According to the present invention, the shift gate is forged as a discrete member and is thereafter interconnected with the cast shift fork. In this way, more relaxed tolerances can be adhered to during manufacturing. Also, if either of the components fails, that component may be replaced without replacing the other component.

Figure 1:
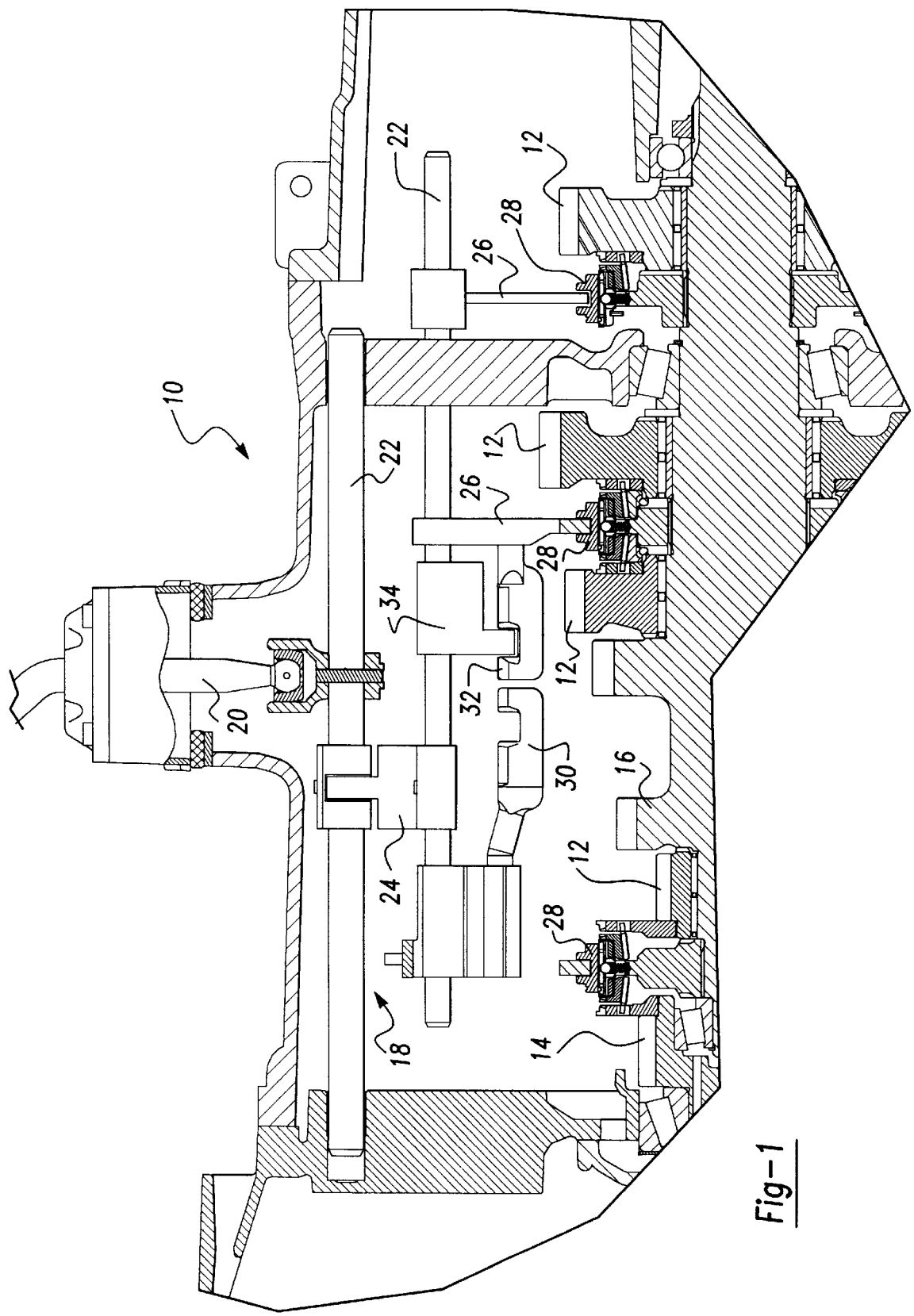
FIG. 1 is a cross-sectional view of a manual transmission including a pair of exemplary shift fork/gate assemblies in accordance with the teachings of the present invention.

Turning now to the drawing figures, a manual transmission 10 substantially similar to that commonly found in modern motor vehicles is illustrated in cross-section in FIG. 1. The manual transmission 10 includes a plurality of axially arranged gearing assemblies 12 independently operable for interconnecting an input shaft 14 and an output shaft 16 at different rotational ratios. A selector assembly 18 is provided for selectively interconnecting different combinations of the gearing assemblies 12 to effectuate the different rotational ratios.

The selector assembly 18 includes an upwardly projecting gear lever 20 frictionally cooperating with a plurality of selector rods 22. Individual members of the plurality of selector rods 22 are discretely interconnected by a plurality of link members 24. The selector rods 22 are coupled to components of the gearing assemblies 12 by a plurality of fork members 26 and synchronizing elements 28.

In order to prevent the selector assembly 18 from inadvertently engaging more than one gearing assembly 12 at any given time, gates 30, 32 and 24c (see FIG. 2) are provided. The gates 24c, 30 and 32 frictionally cooperate with a blocker 34 to prevent members of the plurality of selector rods 22 from axially moving unless properly oriented. However, when properly oriented, the selector rods 22 are positionable to interconnect desired gearing combinations.

Figure 2:
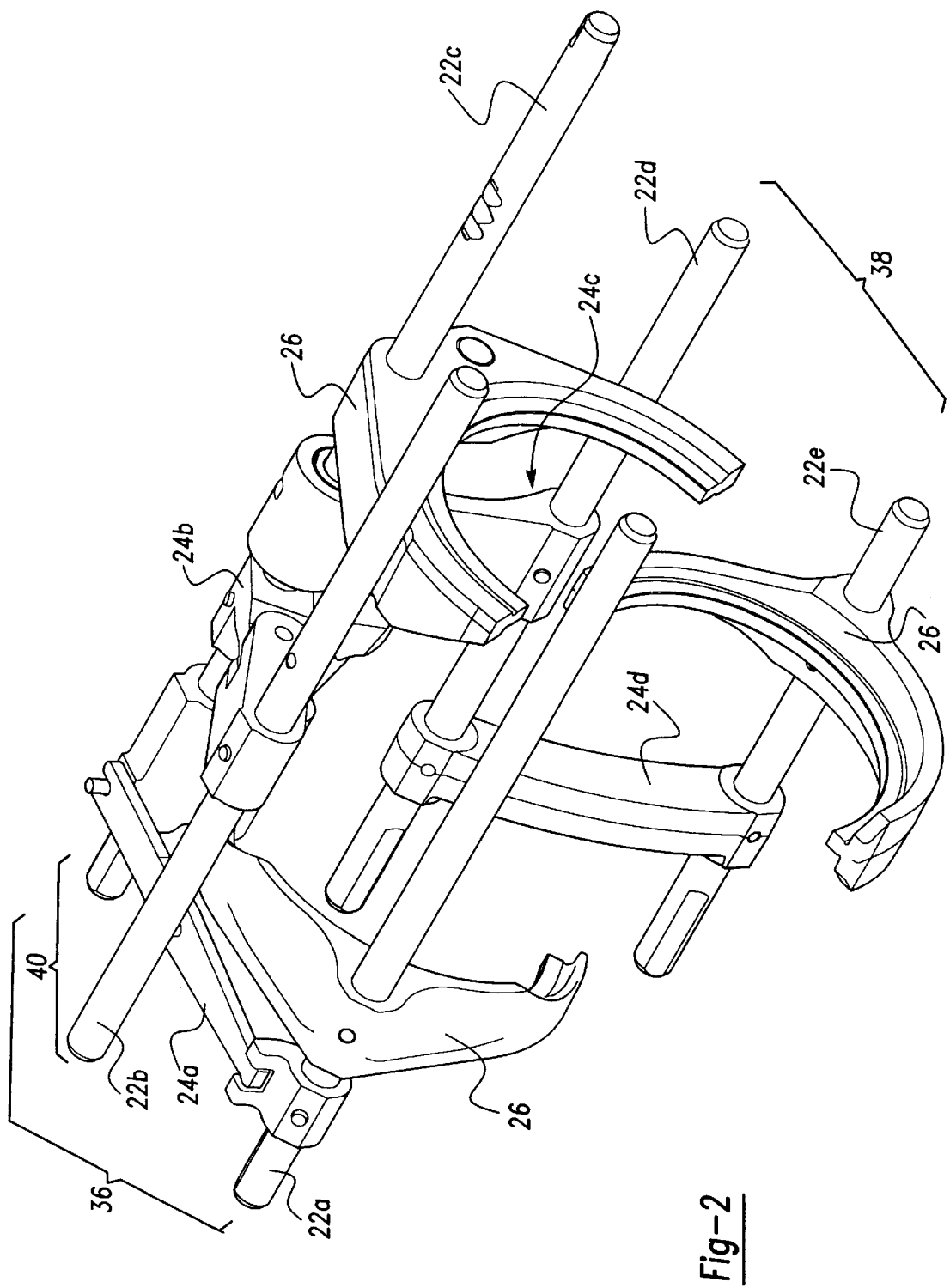
FIG. 2 is a perspective view of the selector assembly of FIG. 1.

Referring now to FIG. 2, the selector assembly 18 is illustrated in greater detail. The selector assembly 18 includes a fifth and sixth gear selector sub-assembly 36 consisting of the combination of the selector rods 22a, 22b and 22c. The selector assembly 18 also includes a third and fourth gear selector sub-assembly 38 and a first and second gear selector sub-assembly 40. The third and fourth gear selector sub-assembly 38 includes the combination of the selector rods 22b, 22c, 22d and 22e. The first and second gear selector sub-assembly 40 includes the selector rods 22b and 22c.

As described above, individual members of the plurality of selector rods 22 are interconnected by the plurality of link members 24. More particularly, the selector rod 22a is coupled to the connector rod 22c via a rigid, one-piece link 24a. The selector rod 22b is connected to the selector rod 22c via a two-piece, pivoting link 24b. The selector rod 22c is coupled to the connector rod 22d via gate 24c. The selector rod 22d is connected to the selector rod 22e via a rigid, one-piece link 24d. Furthermore, the selector rod 22e is connected via frictional engagement with an aperture to a shift fork 26.

Figure 3:
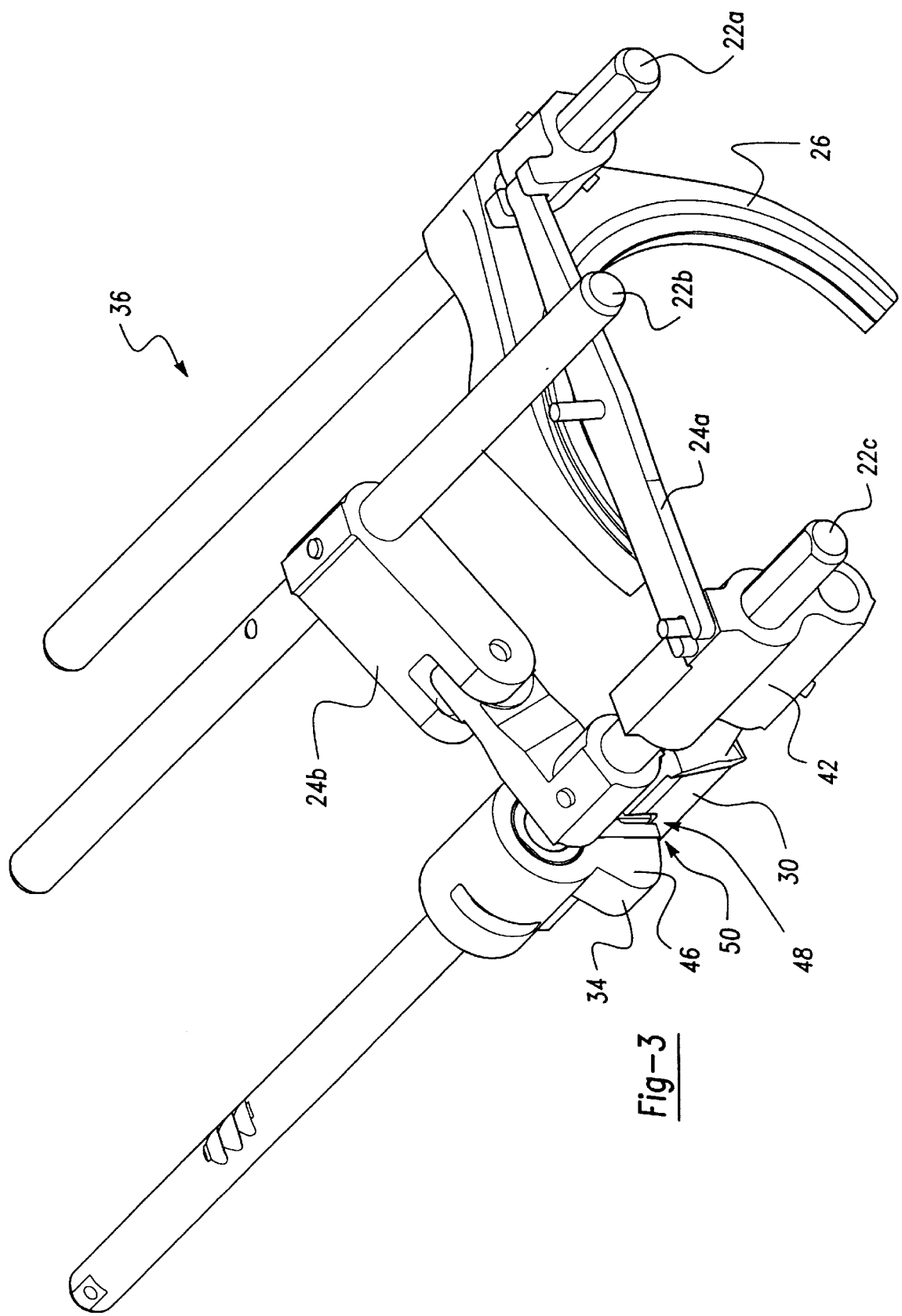
FIG. 3 is a perspective view of a fifth and sixth gear selector sub-assembly of the selector assembly of FIG. 2.

The fifth and sixth gear selector sub-assembly 36 is illustrated in greater detail in FIG. 3. As illustrated in FIG. 3, the fifth and sixth selector sub-assembly 36 has 3been rotated 180° from the illustration in FIG. 2. As can be seen, the first embodiment gate 30 is coupled to the selector rod 22c by an hourglass shaped bracket 42. The gate 30 cooperates with a cylindrically shaped blocker 34 to prevent axial movement of the selector rod 22a and, more importantly, the fork 26 unless the rods 22a, 22b and 22c are properly aligned for shifting between fifth and sixth gears. To accomplish this, the blocker assembly 34 is preferably fixed axially to the wall of the transmission 10 and aligned by the pivot action of links 24b (FIG. 1).

The blocker assembly 34 includes lugs 46 laterally extending from the cylindrical portion thereof which cooperates with a square shaped notch 48 formed in the gate 30 to prevent the gate's axial movement. The blocker assembly 34 also includes an axially aligned channel 50 adjacent the notch 48 enabling the gate 30 to move axially with respect thereto when aligned with the channel 50.

Figure 4:
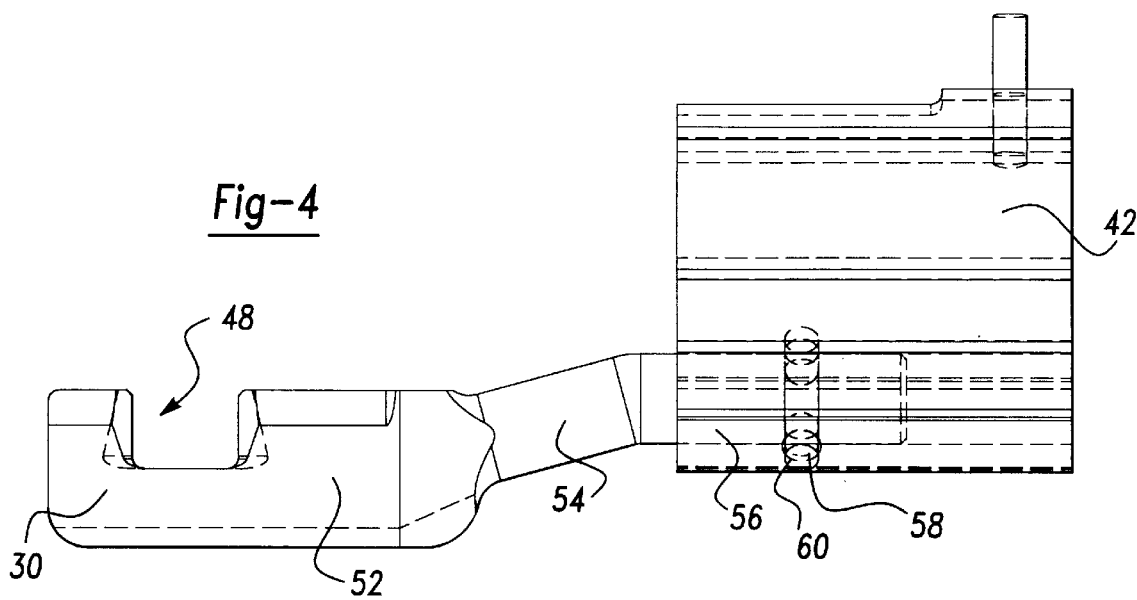
FIG. 4 is a perspective view of a first embodiment shift fork/gate assembly according to the present invention particularly adapted for use within the fifth and sixth gear selector sub-assembly.
Figure 5:
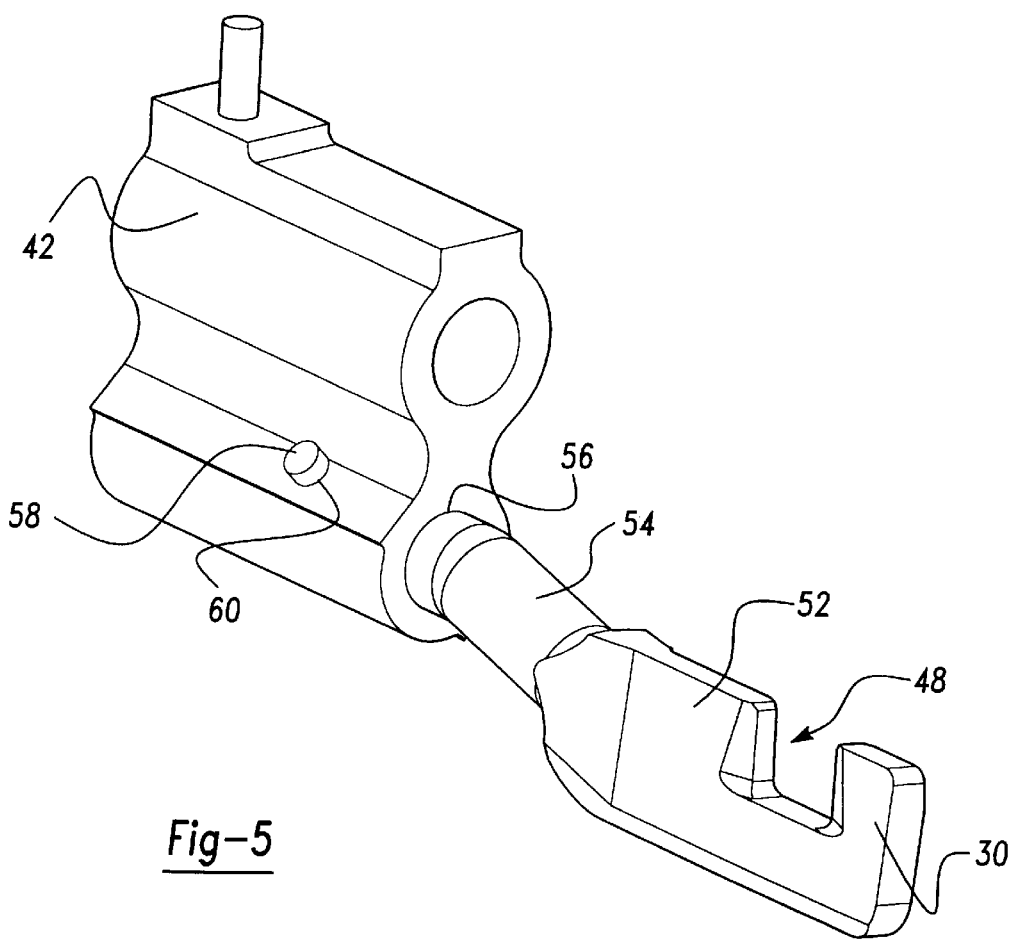
FIG. 5 is a second perspective view of the first embodiment shift fork/gate assembly according to the present invention.

Turning now to FIGS. 4 and 5, the first embodiment gate 30 is shown in greater detail. The gate 30 includes a rectangularly shaped end portion 52 having the notch 48 formed therein. The notch 48 includes bevelled edges transitioning to the end portion 52. The rectangular portion 52 is integrally formed with or is otherwise fixedly secured, such as by welding, to a shaft 54 extending longitudinally therefrom. The shaft 54 includes a bend which offsets its distal end adjacent the end portion 52 from its proximal end adjacent the bracket 42. The proximal end of the shaft 54 is coupled to the bracket 42 via insertion into a longitudinal extending aperture 56. Preferably, the shaft 54 is secured in the aperture 56 by engagement of a laterally projecting roll pin 58 inserted through a transverse hole 60 formed in the bracket 42 and the shaft 54. Alternatively, the shaft 54 may be welded or otherwise fixedly secured to the bracket 42.

In the preferred embodiment of the present invention, the gate 30 is forged into its desired shape. Conversely, the bracket 42 is cast to its desired shape. The aperture 56 may be formed within the bracket 42 during casting or may be drilled therein subsequently. Thereafter, the proximal end of the shaft 54 is inserted within the aperture 56 and the bracket 42 and gate 30 are secured together by the roll pin 58 or by welding. As such, the required casting of the gate in place is eliminated. Furthermore, to improve component positioning, final adjustment may be made prior to pinning, welding, etc. Of course, other means of forming the gate 30 and bracket 42 may be utilized herein.

Figure 6:
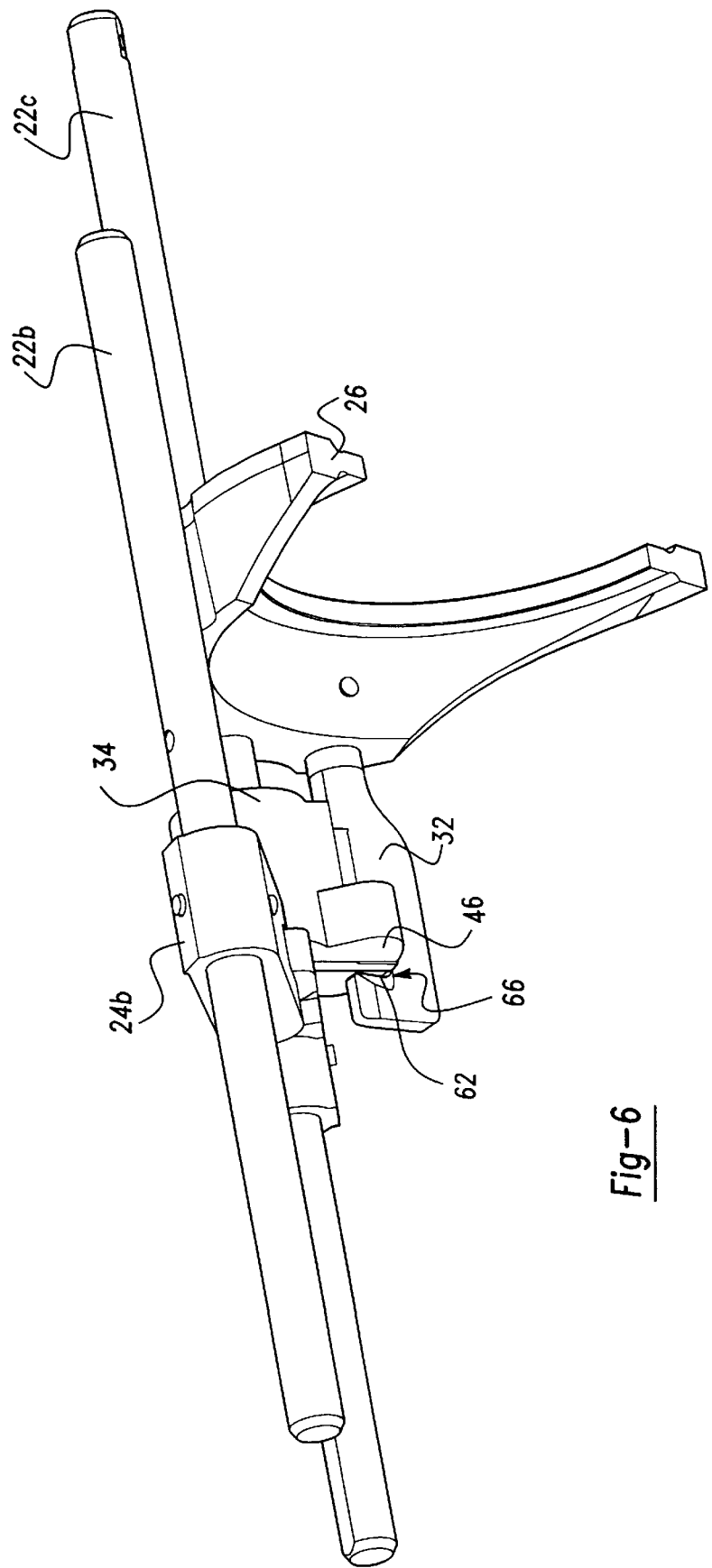
FIG. 6 is a perspective view of a first and second gear selector sub-assembly of the selector assembly of FIG. 2.

The first and second gear selector sub-assembly 40 is illustrated in detail in FIG. 6. As illustrated, the second embodiment gate 32 cooperates with the blocker 34 to prevent movement of the fork 26 prior to proper alignment of the rods 22b and 22c. As with the first embodiment, a square shaped notch 62 in the end portion of the gate 32 selectively engages a laterally projecting lugs 46 of the blocker 34. Preferably, the lugs 46 are formed such that both gates 30 and 32 may engage the blocker 34 simultaneously. When the rods 22b and 22c are properly aligned for shifting between first and second gears, the gate 32 aligns with the channel 50 thereby permitting axial movement of the rod 22c and fork 26. As such, the fork 26 can move axially only when the gate 32 is aligned with the channel 50 and is prevented from moving axially when the gate 32 is aligned with the lug 46.

Figure 7:
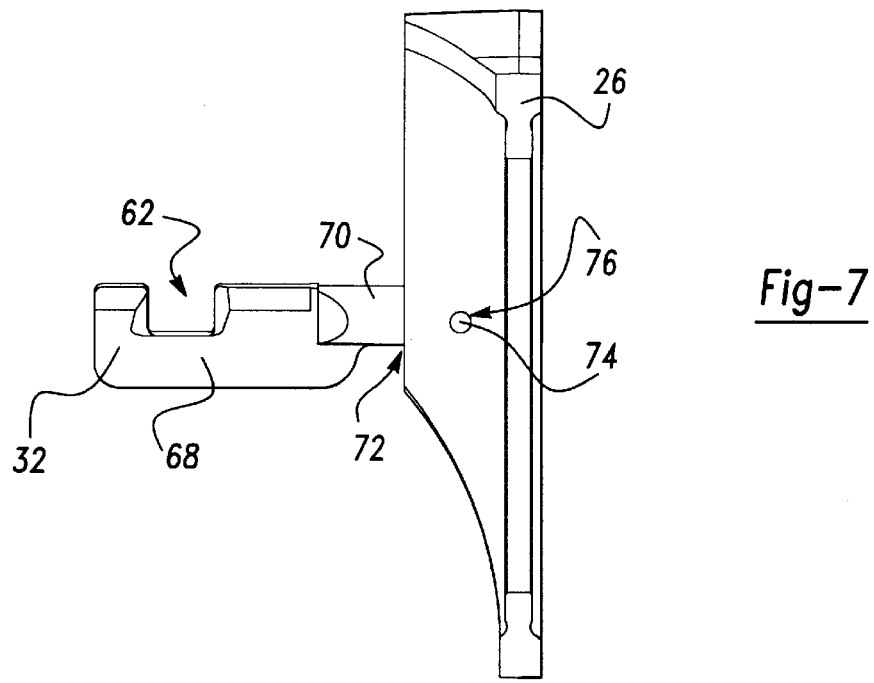
FIG. 7 is a perspective view of a second embodiment shift fork/gate assembly according to the present invention particularly adapted for use within the first and second gear selector sub-assembly.
Figure 8:
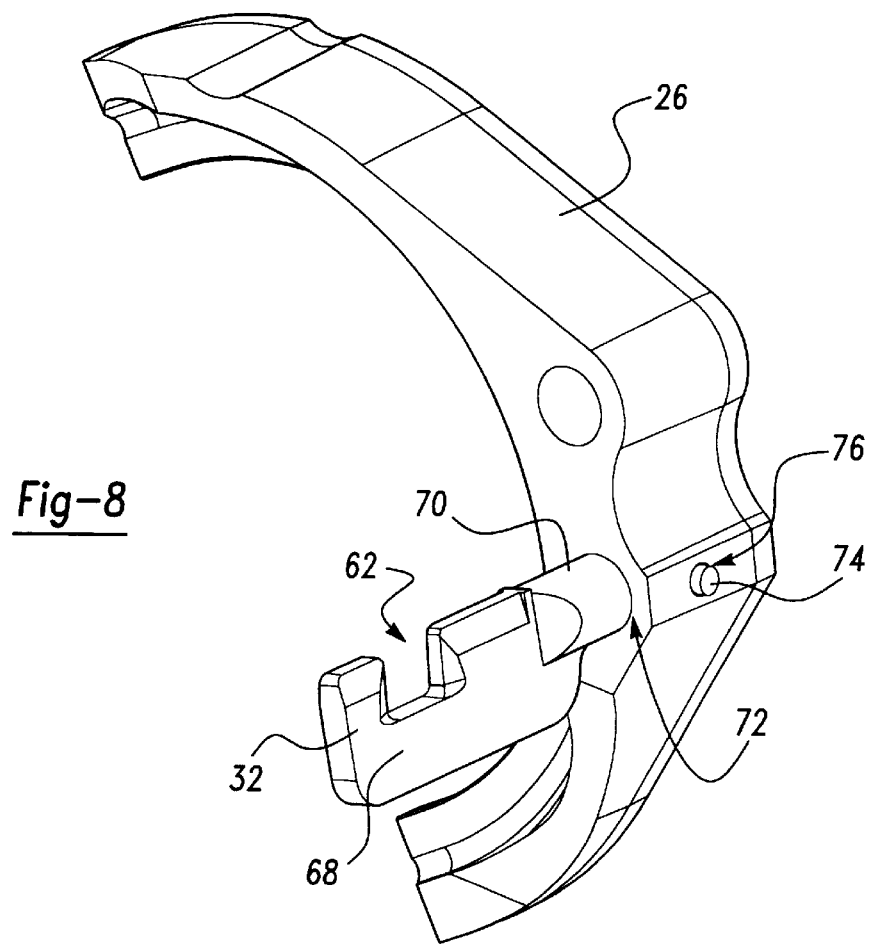
FIG. 8 is a second perspective view of the second embodiment shift fork/gate assembly of the present invention.

Turning now to FIGS. 7 and 8, the second embodiment gate 32 and fork 26 are illustrated in greater detail. The gate 32 includes a rectangularly shaped end portion 68 which is integrally formed or otherwise fixedly secured, such as by welding, to a cylindrically shaped shaft portion 70. The notch 62 is formed in the end portion 68 with bevelled edges to ease its alignment with the channel 50 (FIG. 6). The shaft portion 70 is connected to the fork 26 via insertion into an axially extending aperture 72. The shaft 70 is preferably secured within the aperture 72 by engagement of a roll pin 74 with a transverse hole 76 formed through the fork 26 and the shaft 70. Alternatively, the shaft 70 may be welded or otherwise fixedly secured to the fork 26.

In the preferred embodiment of the present invention, the gate 32 is forged into its desired shape. Conversely, the fork 26 is cast to its desired shape. The aperture 72 may be formed within the fork 26 during casting or may be drilled thereon subsequently. Thereafter, the end of the shaft 70 is inserted within the aperture 72 and the fork 26 and gate 32 are secured together by the roll pin 74 or by welding. As such, the required casting of the gate in place is eliminated. Furthermore, to improve component positioning, final adjustment may be made prior to pinning, welding, etc. Of course, other methods of forming the gate 32 and fork 26 may be utilized herein.

Thus, it is apparent that the present invention provides forged gates which are discretely formed from cast brackets and forks. As such, less strict tolerances may be maintained during manufacturing processes. Furthermore, the two-piece modular design of the present invention facilitates replacing only that component which has failed rather than the entire assembly. Accordingly, the drawbacks associate with the prior art are alleviated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of forming a shift fork/gate assembly for a manual transmission including a gear train having a plurality of gears disposed thereon and a shift control assembly for selecting one of said plurality of gears, said method comprising:

casting a support member;

forming an aperture in said support member;

forging a gate member; and coupling said gate member to said support member by inserting a portion of said gate member in said aperture and securing said portion to said support member.

2. The method of claim 1, further comprising:

forming a hole through said support member transverse to said aperture and forming a second hole in said gate member; and inserting a roll pin through said first and second holes.

3. The method of claim 1 further comprising welding said gate member to said support member.

4. The method of claim 1 further comprising forming said support member as a shift fork.

5. The method of claim 1 further comprising forming said support member as a bracket member.

6. The method of claim 1 further comprising forming said portion of said gate member as a cylindrical shaft.

7. In a manual transmission including a gear train and a shift controller disposed in a housing, a shift fork/gate assembly comprising:

a fork member engaging a synchronizer device disposed along said gear train, said fork including an aperture formed therein;

a first gate member connected to said fork member by securing a portion thereof in said aperture, said gate member cooperating with a blocker coupled to said housing to selectively prevent movement of said fork member;

a bracket member engaging a rod of said shift controller, said bracket member including an aperture formed therein; and a second gate member connected to said bracket member by securing a portion thereof in said aperture, said gate member cooperating with said blocker to selectively prevent movement of said rod;

wherein said fork member is disposed between a first gear and a second gear along said gear train and said bracket member is disposed between a fifth gear and a sixth gear along said gear train.

8. The assembly of claim 7 wherein said first gate member is secured to said fork member by welding and said second gate member is secured to said bracket member by welding.

9. The assembly of claim 7 wherein said fork member and said bracket member are cast.

10. The assembly of claim 7 wherein said first gate member and said second gate member are forged.

11. The method of claim 7 further comprising forming a remainder of said gate member as a rectangularly shaped end portion.

12. The assembly of claim 7 wherein said first gate member is secured to said fork member by a first roll pin and said second gate member is secured to said bracket member by a second roll pin.

13. The method of claim 12 further comprising forming a square shaped notch in said end portion.

14. The method of claim 12 further comprising forming said cylindrical shaft and said end portion simultaneously as an integral unit.

15. The method of claim 12 further comprising welding said end portion to said cylindrical shaft.

16. The assembly of claim 7 wherein said first gate member and said second gates member further comprise a cylindrical shaft portion coupled to a rectangularly shaped end portion.

17. The assembly of claim 16 wherein said rectangularly shaped end portion includes a square-shaped notch.

18. The assembly of claim 16 wherein said cylindrical shaft is integrally formed with said rectangularly shaped end portion.

19. The transmission of claim 16 wherein said cylindrical shaft portion is welded to said rectangularly shaped end portion.

* * * * *

UNITED STATES PATENT AND TRADEMARK OFFICE
CERTIFICATE OF CORRECTION

PATENT NO. : 6,038,938  
APPLICATION NO. : 08/943308  
DATED : March 21, 2000  
INVENTOR(S) : Gerald Szczepanski and John Forsyth Page 1 of 1

It is certified that error appears in the above-identified patent and that said Letters Patent is hereby corrected as shown below:

Column 4, line 52, "associate" should be --associated--.

Column 6, line 35, claim 19, "transmission" should be --assembly--.

Signed and Sealed this

Third Day of October, 2006

JON W. DUDAS  
*Director of the United States Patent and Trademark Office*